Figure 1:
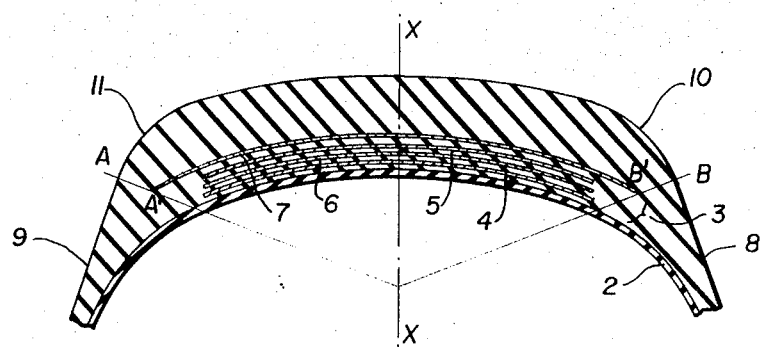

United States Patent
Barassi et al.

[15] 3,656,533
[45] Apr. 18, 1972

[54] MULTI-MATERIAL BREAKERS IN RADIAL TIRES

[72] Inventors: Carlo Barassi; Giuseppe Lugli; Mario Mezzanotte, all of Milan, Italy

[73] Assignee: Industrie Pirelli S.p.A., Milan, Italy

[22] Filed: Sept. 17, 1970

[21] Appl. No.: 73,112

[30] Foreign Application Priority Data

Oct. 4, 1969 Italy.................................22947 A/69

[52] U.S. Cl..............................................................152/361
[51] Int. Cl..........................................................B60c 9/18
[58] Field of Search..................152/354, 355, 356, 357, 359, 152/361

[56] References Cited
UNITED STATES PATENTS

3,242,965  3/1966  Mirtain.................................152/361

Primary Examiner—Arthur L. La Point
Assistant Examiner—George H. Libman
Attorney—Stevens, Davis, Miller & Mosher

[57] ABSTRACT

A breaker structure for radial tires includes two or more strips of textile material in which the cords are inclined at a selected angle in one direction relative to the mid-circumferential plane, at least one strip compression-resistant material between the textile strips and in which the cords are inclined in an opposite direction to the textile cords, and an additional strip of compression-resistant material disposed radially outwardly of the aforesaid strips.

4 Claims, 2 Drawing Figures

PATENTED APR 18 1972 3,656,533

INVENTORS
CARLO BARASSI
GIUSEPPE LUGLI
MARIO MEZZANOTTE

BY Stevens, Davis, Miller & Mosher

ATTORNEYS

MULTI-MATERIAL BREAKERS IN RADIAL TIRES

The present invention pertains to "radial tires," namely, tires provided with a carcass formed by cords lying in radial planes, or forming small angles with said planes. More precisely, the invention relates to the breaker structure of radial tires.

It is known that the presence of a relatively stiff annular structure, inserted between the tread and the carcass, is essential in radial tires. Such a structure, which in the present description will simply be called "breaker," critically affects performance of the tire depending upon the angular relationship between its cords and the materials of which it is made. These tires are renowned for their long life and for some other important features, such as road holding, driving safety and travelling comfort. All of such features are influences by the geometrical configuration of the breaker and by the selection of the materials forming the latter. The results obtained up to the present time in several applications to radial tires have proved highly satisfactory.

The increasing need of still better performance of pneumatic tires has led to the adoption of breaker structures which particularly improve the road holding and the driving safety characteristics. However, this involves an excessive stiffness of the breaker, with a consequent reduction in the tire travelling comfort and a reduction of the tire life characteristics, due for the most part to an irregular wear, localized in particular in the lateral portions of the tread band.

The present invention aims at providing a high speed pneumatic tire, having the desired road holding and driving safety characteristics, and also having satisfactory travelling comfort without the irregular wear phenomena. This is obtained by the use of layers of fabric, made of different materials, and appropriately superimposed, and also by a suitable arrangement of the cords of the various layers at pre-established angles.

In the present description the expression "textile material" has a meaning conventionally attributed to it in the tire industry and comprises, by way of example, organic textile materials, as cotton and rayon; and fibers from synthetic polymers, as polyamide fibers, polyester fibers and the like.

Briefly summarized, the present invention provides a tire for vehicle wheels having a radial carcass and a breaker structure constituted by strips of cord fabric of textile material and by strips of cord fabric of metallic material, or of some other compression-resistant material, the cords of said strips being inclined with respect to the mid-circumferential plane. The breaker structure has two or more superimposed strips of textile material, the cords of which are inclined at an angle ranging between 10° and 30° in one direction relative to the mid-circumferential plane of the tire.

The breaker also has at least one metallic strip, or a strip made of another material which has a high modulus of elasticity and which is inserted between the textile strips, the cords of which are inclined at an angle ranging between 13° and 33° in an opposite direction, such angle being greater by at least 2° than the angle formed by the cords of textile strips with respect to the mid-circumferential plane. Further, the breaker has an additional strip of metallic material, or of some other compression-resistant material, disposed in a radially outer position, the cords of which form an angle ranging between 60° and 90° relative to the mid-circumferential plane. The additional strip is preferably made of steel cords, but large threads of synthetic material, as for instance polyamide, may be used for this purpose.

The excellent characteristics of road holding and driving safety at high speed, in a tire provided with the above described breaker structure are probably due to the combination of the textile strips with metallic strips having their cords inclined at a slightly greater angle. In such a combination, the metallic cords and the textile cords, by virtue of their different angular arrangement, cooperate better than in conventional tires. Moreover, the reduction in the travelling comfort which might be expected because of the presence of cords disposed along three different directions, does not take place. Further, the additional strip of metallic fabric, disposed in a radially outer position and having a width equal to that of the tread provides a solid support for the blocks of the tread pattern, so that the latter are stiffened and are less flexible when they come into contact with the ground. This feature contributes to the elimination of the localized irregular wear of the tread, and considerably improves the road holding of the tire on wet ground, since the blocks and the grooves of the treads which remain in their original molding position, facilitate water elimination.

In the present description, the expression "width of the tread" means the entire portion of the tire which comes into contact with the ground, both on rectilinear runs and on cornering, so that, in the event of tires having a tread joined to the sidewalls by means of more or less extended connecting portions, the "tread" also includes the lateral part of the connecting portions.

In a preferred embodiment of the invention, the additional strip of metal cords has a width greater by 5–20 percent than the largest one of the other underlying layers. This reduces the possibility of detachment of the breaker edges and at the same time provides adequate support for the tread blocks.

It has been ascertained by testing that the cords of the radially outermost additional strip of metallic fabric preferably should lie on a plane other than the plane perpendicular to the mid-circumferential plane of the tire, since said perpendicular arrangement has an unstable equilibrium. Better results are obtained with angles ranging between 75° and 85°.

Figure 2:
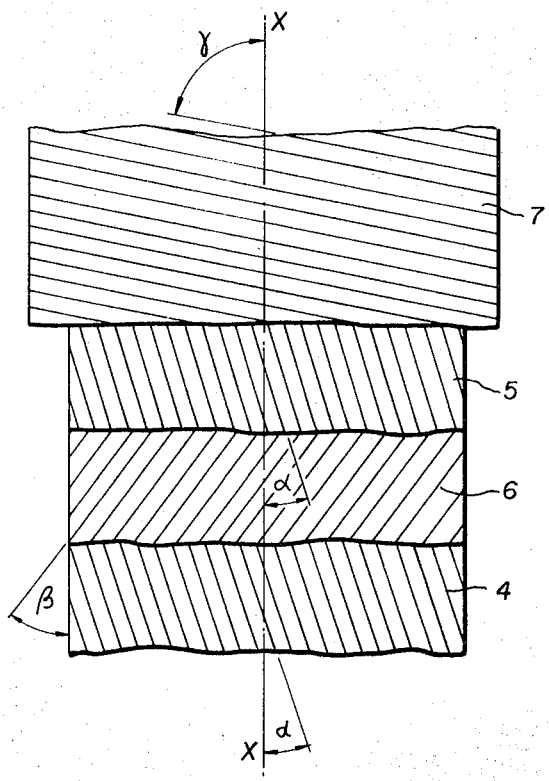

The present invention will now be better illustrated with reference to the attached drawing, given by way of nonlimiting example, in which:

FIG. 1 illustrates diagrammatically and in cross section the tread portion of a tire according to the present invention; and FIG. 2 shows in plan view the breaker structure of the tire shown in FIG. 1, with parts broken away to illustrate the position of the cords.

In FIG. 1, the tire comprises a tread 1 and a carcass 2, formed by layers, whose cords lie in radial planes. A breaker structure 3 is inserted between the tread and the carcass. This breaker comprises two layers 4 and 6 of textile material having cords parallel to one another and all directed in the same sense at an angle $\alpha$ of 18° with respect to the mid-circumferential plane X—X of the tire. A strip 6, formed by metallic cords, parallel to one another and inclined at an angle $\beta$ of 22° with respect to the mid-circumferential plane X—X, is disposed between the strips 4 and 5. The metallic cords are inclined in a direction opposite to that of the textile cords of the strips 4 and 5.

The width of the strips 4, 5 and 6 is substantially equal and extend below the tread for a portion which is considered as conventional for radial tires.

A layer 7, formed by metallic cords parallel to one another and inclined at an angle $\gamma$ of 80° with respect to the mid-circumferential plane of the tire, is disposed above the strips 4, 5 and 6. The inclination of the metal cords has a direction equal to that of the textile cords of the strip 5. The width of this metal layer is greater by 16 percent than the width of the underlying strips and substantially corresponds to the whole width of the tread. The expression "whole width" means the entire part of the tire which comes into contact with the ground both on rectilinear runs and on cornering and, in the case of tires whose tread profile has rounded lateral corners, also the entire portion of connection of said tread with the tire sidewalls. By way of example, such portion could be comprised between points A and B of the tread shown in FIG. 1, which are defined as tangent points between the profiles of the sidewalls 8 and 9 and the connecting portions 10 and 11.

Accordingly, the width of the metallic layer remains substantially defined by points A' and B' lying on the segment which joins points A and B to the center of gravity O of the tire section.

To those skilled in the art, the advantages and utilization of the present invention will be readily apparent from the foregoing description. However, it should be understood that the present invention is not restricted to the above described examples, but that it includes any other alternative embodiment deriving from the above indicated inventive concept and falling within the scope of the appended claims.

What is claimed as new is:

1. A pneumatic tire for vehicle wheels which comprises a tread, a radial carcass and a breaker structure constituted by strips of cord fabric of textile material and by strips of cord fabric of compression-resistant material, the cords of said strips being inclined with respect to the mid-circumferential plane, and which is characterized in that said breaker structure comprises at least two superimposed strips of textile material, the cords of which are inclined relative to the mid-circumferential plane, at an angle ranging between 10° and 30° in one direction, at least one strip of a compression-resistant material having a high modulus of elasticity, and inserted between said textile strips, the cords of which are inclined at an angle ranging between 13° and 33° in an opposite direction, said angle being greater by at least 2° than the angle formed by the cords of said textile strip with respect to said plane, and an additional strip of compression-resistant material, disposed in a radially outer position, the cords of which form an angle ranging between 60° and 90° with respect to said plane.

2. A pneumatic tire as in claim 1, characterized in that the cords of the radially outermost additional strip are inclined at an angle ranging between 75° and 85° with respect to the mid-circumferential plane.

3. A pneumatic tire as in claim 1, characterized in that said additional strip has a width greater by 5–20 percent than the largest one of the other strips.

4. A pneumatic tire as in claim 1, characterized in that said additional strip has a width substantially equal to that of said tread.

* * * * *